US00RE37588E

(19) United States
(12) Reissued Patent
Ornstein

(10) Patent Number: US RE37,588 E
(45) Date of Reissued Patent: Mar. 19, 2002

(54) GAMING SYSTEM AND METHOD FOR MULTIPLE PLAY WAGERING

(75) Inventor: Marvin Ornstein, Ocean Springs, MS (US)

(73) Assignee: Mao, Inc., Ocean Springs, MS (US)

(21) Appl. No.: 09/506,458

(22) Filed: Feb. 17, 2000

Related U.S. Patent Documents

Reissue of:
(64) Patent No.: 5,718,431
Issued: Feb. 17, 1998
Appl. No.: 08/804,299
Filed: Feb. 21, 1997

(51) Int. Cl.[7] ..... A63F 1/00
(52) U.S. Cl. ..... 273/292; 273/309; 273/274
(58) Field of Search ..... 273/274, 309, 273/292; 463/12

(56) References Cited

U.S. PATENT DOCUMENTS 5,490,670 A * 2/1996 Hobert ..... 273/309
5,538,252 A * 7/1996 Green ..... 273/306
5,593,161 A * 1/1997 Boylan et al. ..... 273/274

OTHER PUBLICATIONS

"Blackjack Introduced at Table Mountain" by Royal Calkins, The Fresno Bee, Nov. 10, 1992.*

* cited by examiner

*Primary Examiner*—Benjamin H. Layno
(74) *Attorney, Agent, or Firm*—Volpe and Koenig, P.C.

(57) ABSTRACT

A gaming method and system which allows a player to wager varying amounts of whether that player will have multiple consecutive wins of a game of chance and which provides a simplified arrangement for monitoring the progress of such bets made by one or more players.

28 Claims, 6 Drawing Sheets

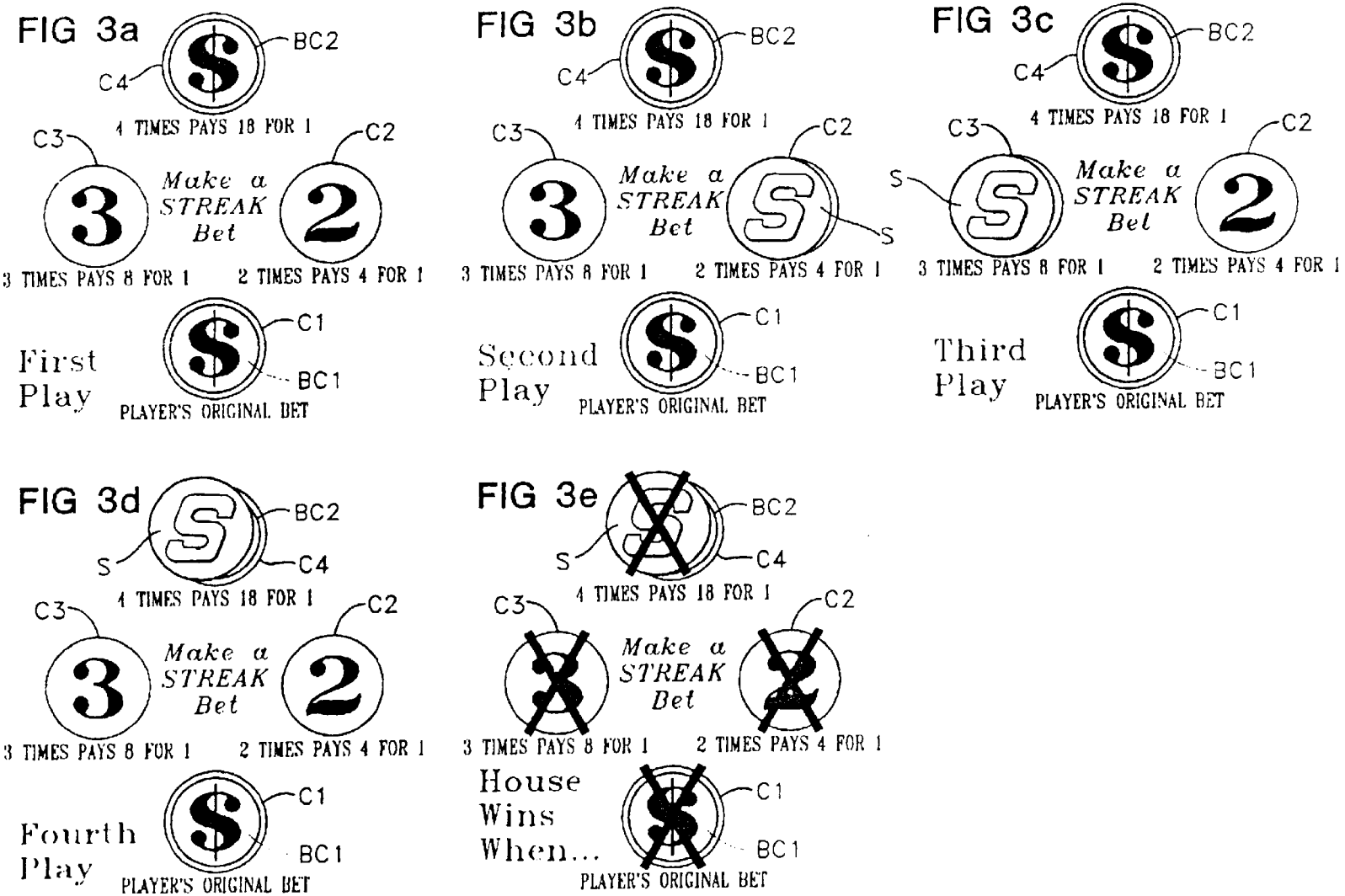
FIG 3a
BC2
C4
C2
C3
4 TIMES PAYS 18 FOR 1
Make a STREAK Bet
3 TIMES PAYS 8 FOR 1
2 TIMES PAYS 4 FOR 1
C1
BC1
PLAYER'S ORIGINAL BET
First Play
FIG 3b
BC2
C4
C2
S
C3
4 TIMES PAYS 18 FOR 1
Make a STREAK Bet
3 TIMES PAYS 8 FOR 1
2 TIMES PAYS 4 FOR 1
C1
BC1
PLAYER'S ORIGINAL BET
Second Play
FIG 3c
BC2
C4
C2
C3
S
4 TIMES PAYS 18 FOR 1
Make a STREAK Bet
3 TIMES PAYS 8 FOR 1
2 TIMES PAYS 4 FOR 1
C1
BC1
PLAYER'S ORIGINAL BET
Third Play
FIG 3d
BC2
C4
C2
S
C3
4 TIMES PAYS 18 FOR 1
Make a STREAK Bet
3 TIMES PAYS 8 FOR 1
2 TIMES PAYS 4 FOR 1
C1
BC1
PLAYER'S ORIGINAL BET
Fourth Play
FIG 3e
BC2
C4
C2
S
C3
4 TIMES PAYS 18 FOR 1
Make a STREAK Bet
3 TIMES PAYS 8 FOR 1
2 TIMES PAYS 4 FOR 1
C1
BC1
PLAYER'S ORIGINAL BET
House Wins When...

GAMING SYSTEM AND METHOD FOR MULTIPLE PLAY WAGERING

Matter enclosed in heavy brackets [ ] appears in the original patent but forms no part of this reissue specification; matter printed in italics indicates the additions made by reissue.

FIELD OF THE INVENTION

This invention relates generally to games of chance such as are found in casinos and other legal gambling establishments and more particularly to a gaming system which can be used to play blackjack, roulette, craps, baccarat and poker either at a table or a video machine or slot machine.

The same gaming system can be used to play any game of chance wherein the player's chance to win is fifty percent (50%), less a reasonable house edge resulting from the inherent rules of the relevant game.

The same gaming system can be applied to the home video, home computer and arcade markets.

BACKGROUND OF THE INVENTION

In those areas of the United States and the rest of the world where gambling is legal, there is a constant demand and need for new or improved games of chance to attract gamblers to casinos and other gaming establishments. At the same time, experienced players have become familiar with traditional games of chance and gaming machines such as slot machines, video games, blackjack tables, roulette tables, baccarat tables, crap tables and poker tables. Therefore, it is desirable that any new gaming machine or system, which, while taking advantage of this familiarity create new or added interest in the game.

One technique that can be used to increase the attraction of games of chance and lengthen the time in which the players will stay at a particular gaming table or casino is to base the player's ultimate winning payoff not just on a single play of a game but on their success on repeated plays. In other words, a player is given an opportunity to increase his or her payoff odds by winning the game two, three or four consecutive times, for example. Unfortunately, using prior art gaming tables and systems, there has not been an efficient way for casinos and casino dealers to keep track of consecutive wins or losses by a player at a particular time in order to readily determine and calculate payoffs based on successive wins or losses.

What is needed, then, is a gaming method and system which can accommodate one or more gamblers while allowing for multiple play wagering, that is, where the player receives an ultimate payoff based upon achieving a preselected number of consecutive wins at the game of chance. U.S. Pat. No. 5,570,885 invented by the inventor of the present invention, teaches an electronic gaming system for playing such a game. However, it is desirable to provide a simplified, non-electronic and non-electromechanical technique for use in applications where the expense of the equipment disclosed in my U.S. Pat. No. 5,570,885 is not warranted. Such a simplified and yet efficient system is lacking in the prior art.

BRIEF DESCRIPTION OF THE INVENTION

One object of the present invention is to provide an inexpensive gaming method and system that allows a player to receive an enhanced payoff based on achieving a predetermined number of consecutive wins at a game of chance.

Another object of the gaming system of the present invention is to allow multiple players at a gaming table to place bets based on number of consecutive wins or losses and to provide means to easily and readily monitor the progress towards winning such bets.

In accordance with these and other objects which will become apparent below, the gaming method and system of the present invention is based on a consecutive game win/lose monitoring technique which allows an operator, such as a dealer, to keep track of each individual player's consecutive wins or losses.

The system can be used to play conventional games of chance, such as blackjack, roulette, baccarat, craps and poker or any game of chance wherein the player's chance to win is fifty percent (50%) less a reasonable house edge resulting from the inherent rules of the relevant game. The system can be easily incorporated with a conventional gaming table, such as blackjack, in which each player's seating area at the table is provided with a player-specific bet selection area having marks (i.e. chip receiving regions) for receiving special markers, such as chips. The bet selection markers are used by the player to indicate how many consecutive wins that player believes he will win in order to receive an enhanced payoff, based on predetermined odds. A player also selects a bet value which, in accordance with one preferred embodiment of the system, is entered by placing a chip or chips of the desired denomination upon the desired consecutive win mark.

A plurality of chip marking locations are provided convenient to a dealer and adjacent to each player's position about a table, such as for example a blackjack table. Chips placed on consecutive wins marks represent only the consecutive win bet. Conventional blackjack bets will continue to be made by placing a chip or chips on the betting circle or square of each player and separate from the consecutive win mark. In one preferred embodiment, up to four consecutive wins may be selected by a player. Each marker location preferably contains a number which identifies the consecutive win bet together with the odds. An original bet chip mark is also provided for the placement of the "streak chip" to indicate that the player is attempting to win the first of a certain number of consecutive wins. The original bet chip mark may also be used by a casino for the player's conventional bet.

In the play of each game, the dealer places a consecutive number of wins chip, hereinafter referred to as a "streak" chip on the marker locations before the player wins the relevant game. For example, assuming that the player has selected two consecutive wins by placing a chip or chips on the consecutive wins marker bearing the number "2", and, assuming the player has won the first game, the dealer pays off the original conventional bet and places the streak chip upon the chip bet by the player which is on the marker bearing the consecutive win number "2", indicating that the player has won one game and will win his consecutive wins bet with one more win. If the player wins the second game, the player thus wins his second conventional bet plus his consecutive win bet. If the player loses any game before two consecutive wins, the streak chip is removed and the chips originally placed on the consecutive wins mark bearing the number "2" are removed.

In the event that a player selects more than two consecutive wins (i.e. three or four consecutive wins) the streak chip, after two consecutive wins is moved to the marker indicating three consecutive wins, and so forth. The streak chip and streak marker locations are designed to simplify and ease the responsibility of the dealer in the monitoring of consecutive win bets.

BRIEF DESCRIPTION OF THE FIGURES

FIGS. 3a through 3e show the manner in which the marking locations of FIG. 2 are utilized during play.

DETAILED DESCRIPTION OF THE INVENTION AND PREFERRED EMBODIMENTS THEREOF

Figure 1:
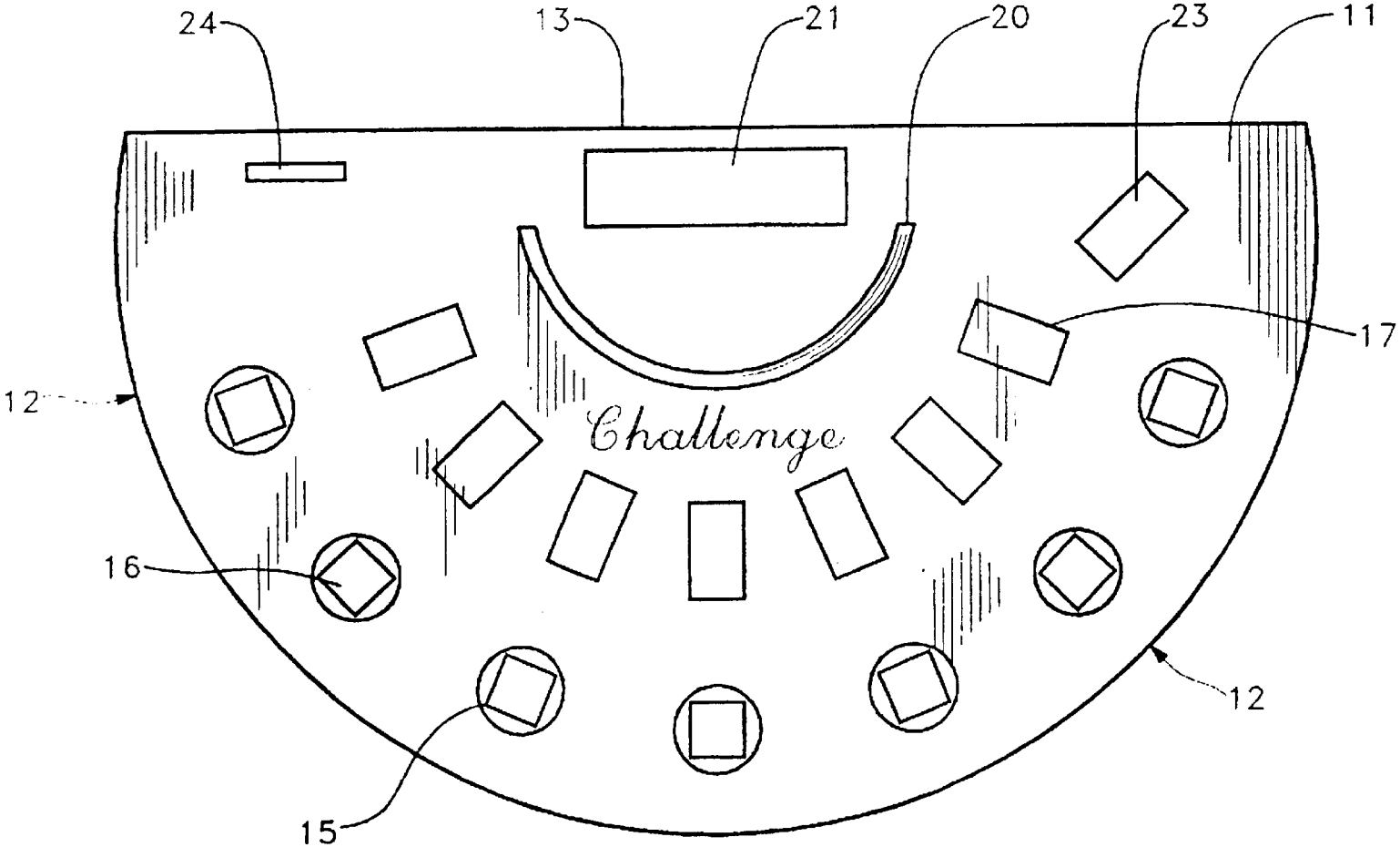
FIG. 1 is a plan view of a first embodiment of the system of the present invention in which the game of chance is blackjack played at a multiple player blackjack table.

Referring to FIG. 1, a first embodiment of the gaming system is shown. In this embodiment, the game of chance is blackjack, a game having rules and objectives well known to those of ordinary skill in the art as well as those in the gaming community as a whole. In gaming casinos, blackjack is conventionally played at a blackjack table 11 having multiple player seating areas 12 to allow more than one player to participate at single table 11. The game is run by a dealer who stands in the dealer area 13. The dealer area 13 and multiple player seating areas 12, including the players' conventional betting areas 17 are sometimes distinguished from one another by a divider 20 to eliminate or reduce the risk of accidental mixing of the dealer cards and player cards. Betting areas 15 are provided for each player to receive a chip or chips representing a conventional blackjack bet and/or a consecutive wins bet, the detailed arrangement being shown in FIG. 2. Placed convenient to each player seating area 12 and betting area 15, and convenient to the dealer, is a betting area 17 in which are placed chips utilized for the conventional blackjack bet. As discussed below, the conventional blackjack bet may be placed in a betting area 15 when the player makes a consecutive wins bet and said bet remains active. A relevant casino may choose to restrict conventional bets to section 15, whether or not a consecutive wins bet is active.

Figure 2:
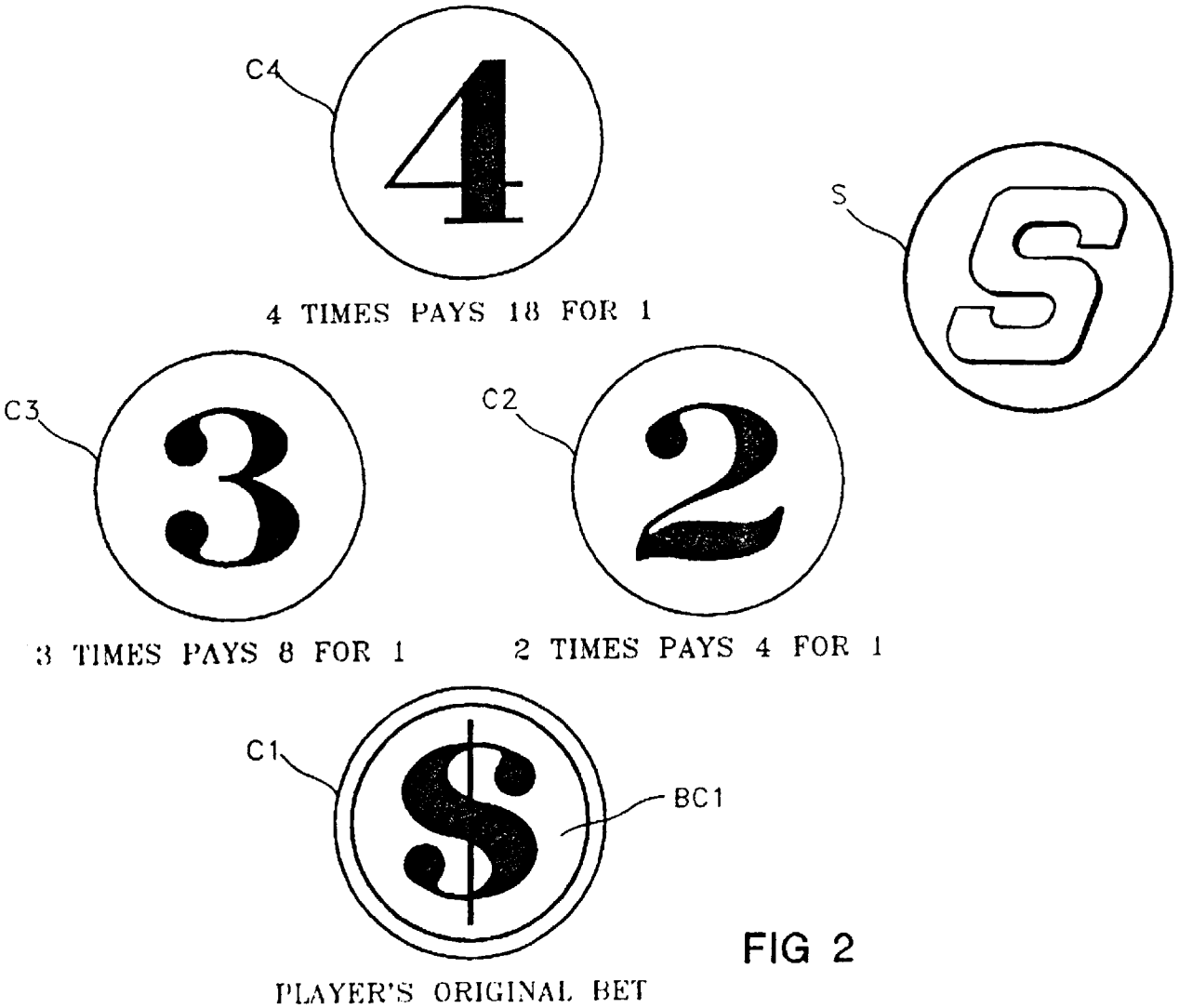
FIG. 2 is a detailed plan view showing the markers and chips utilized by the dealer for monitoring the consecutive play bets for each player.

Making reference to FIG. 2 the region 15 includes four circles C1 through C4 respectively. The circles are arranged to accommodate circular-shaped chips, as is currently the standard in casinos. The same chips used to make a conventional blackjack bet will be used to make a streak bet.

The chip receiving regions C1 through C4 each preferably carry a numeric indica namely "1" through "4", respectively. Adjacent to each of the chip receiving areas is a legend specific to that chip receiving area. For example area C1 carries a legend "Player's Original Bet". This is a position where the streak chip and/or conventional bet chips are placed. When a streak bet is active the player will place all bets in C1 rather than betting area 17, where conventional bets are placed when streak bets are not active. The denomination of the chip or chips placed therein are typically limited by the house. For example, some tables may have a $25.00 minimum bet and a maximum bet of $1,000.00. A chip or chips are placed in the chip receiving area C1 representing the player's bet and having a denomination lying between the minimum and maximum bet allowed by the house.

Chip receiving area C2 has the legend "2 times pays 4 for 1" associated therewith. This indicates to the player that if it is desired to make a consecutive wins bet in addition to an original bet, namely that the player is betting that he will win two consecutive blackjack games in a row, the player places a betting chip on location C2.

In a similar fashion in the event that a player wishes to bet that he will win three (3) consecutive games in a row, the player places a chip in the amount of the bet desired by the player (again being a denomination within the house upper and lower limits) in chip receiving area C3 which indicates to the player and the dealer that three (3) consecutive wins pays 8 for 1 odds.

In a similar fashion chip receiving area C4 advises the player and dealer that four consecutive wins pays 18 for 1.

Making reference to FIGS. 3a through 3e, typical cycles of play are as follows:

Prior to selecting a consecutive wins, the player makes a conventional bet by placing a chip (or a number of chips), representing currency, within betting circle C1 up to the maximum bet amount allowed by that casino or "house".

The consecutive number of wins is selected and the amount to be bet is simultaneously selected by placing a chip (or chips) of the desired denomination on the desired chip receiving region which is one of the regions C2 through C4. FIG. 3a shows an example where the player has made an original bet by placing a chip BC1 in receiving regions C1 and placing a chip BC2 of the desired denomination in region C4 indicating that the player expects to win four games in a row.

After the play of the first hand and assuming that the player making the bets in FIG. 3a has a winning hand, a streak chip S, which is under the control of the dealer, is placed in region C2 by the dealer. The player's original bet is paid off and the player then makes another original bet preparatory to initiation of the second play, as shown in FIG. 3b.

Assuming that the player is a winner during the second play, preparatory to the third play, the dealer pays off the player at the location shown in FIG. 3b on the original bet and moves the streak chip S to the receiving region C3. The betting chip BC2 representing the four consecutive wins bet made by the player remains in region C4. The player makes another original bet preparatory to the play of the third game, as shown in FIG. 3C.

Assuming that the player at the location represented by FIG. 3c wins the play of the third hand preparatory to the fourth play, the dealer pays off the player at the location shown in FIG. 3c on the original bet and moves the streak chip S to the receiving region C4. The betting chip or chips representing the four consecutive wins bet made by the player remains in region C4 under the streak chip S. If the player wins the fourth consecutive hand, the dealer pays the player the amount of the original bet and an amount representing 17 times the streak (i.e. four consecutive wins) bet as represented by FIG. 3d.

In the event that a player loses any game prior to winning four continuous games i.e. if the player loses to the dealer during any one of the first, second, third or fourth games, the house wins the streak bet and the conventional bet of the relevant game the player has lost, as represented in FIG. 3e.

Although the example given provides for a streak bet of four consecutive wins, a player can select a streak bet of two consecutive wins or three consecutive wins, if desired. If desired, a greater number of consecutive wins may be provided.

When the streak chip S reaches the streak bet, i.e. if placed upon the streak bet chip BC2 as shown in FIG. 3d, the player and the dealer know that the next hand is the potential streak win. Conversely, if a player loses the fourth game or any game prior to the play of the fourth game, the house wins.

Conventional bets must be played during the process and the play rules for conventional bets are not changed in any way except that conventional bets without streak bets may be placed in betting area 17 and conventional bets, whenever streak bets are made, will be placed as the original bet (conventional bet) as shown at C1, FIG. 2 and BC1, FIGS. 3a–3e. A relevant casino may choose to eliminate the conventional betting area 17 and use area 15 for conventional betting, whether or not a streak bet (i.e. consecutive wins) is made. With respect to streak bets, pushes (ties) may either advance a streak bet or result in a tie with no effect on the streak bet. The relevant payoff of the streak bet will be affected by the relevant casino's decision to count pushes as wins or ties. If the player splits his conventional bet one or more times, the streak bet will win or lose depending on the net result of the split. If the net result of the split is neither a win nor a loss, the streak bet remains intact. Double downs result in a single win or a single loss.

Play of each blackjack hand begins by the dealer dealing the player's cards to each player and dealing cards to himself in front of chip rack 21. The first game of blackjack proceeds in a conventional manner with winners being declared in accordance with the rules of the game.

Figure 4:
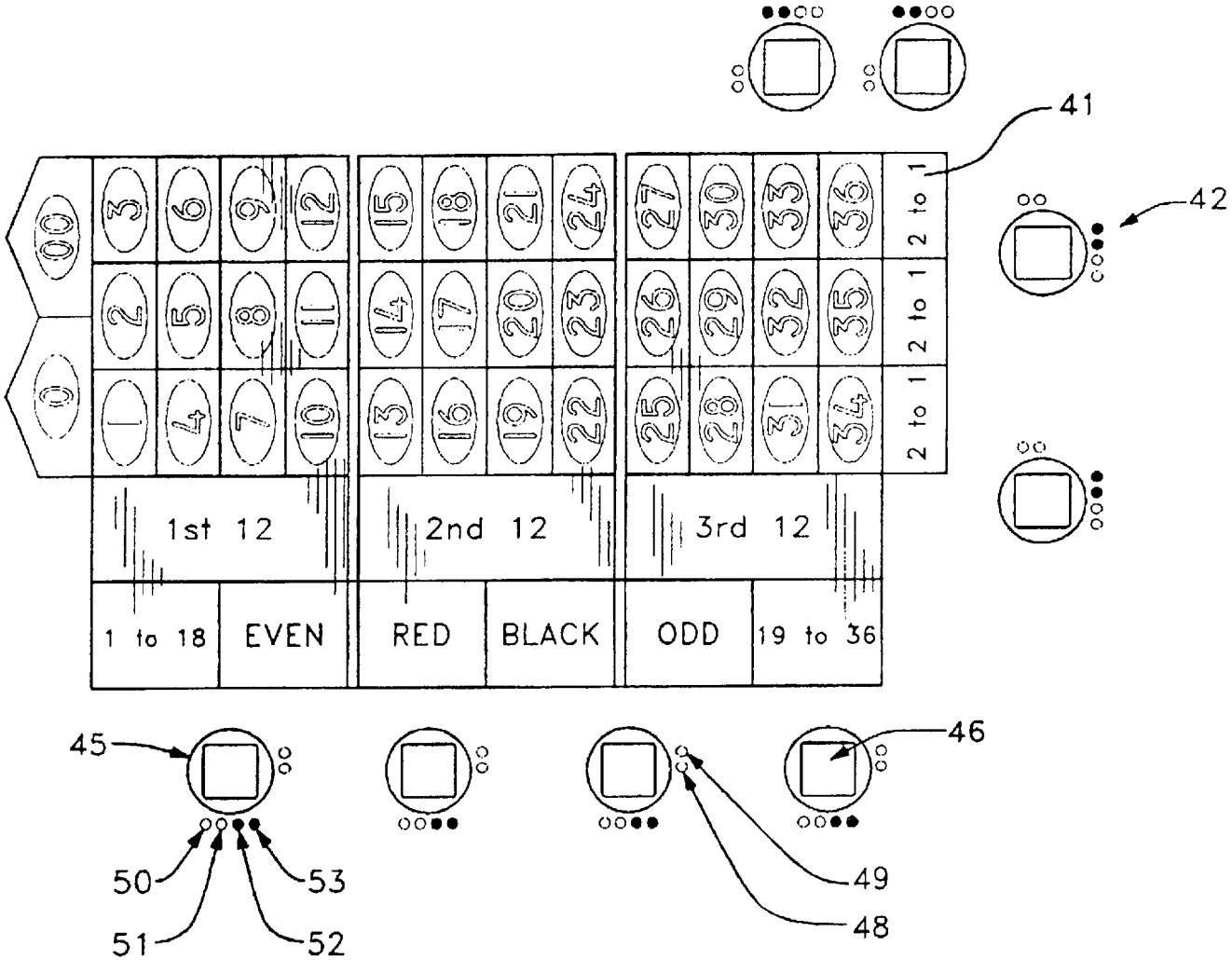
FIGS. 4 through 6 are plan views of additional embodiments of the system of the present invention in which the game of chance is, respectively: roulette played at a roulette table; craps and baccarat and in which the consecutive wins betting method and system are employed.
Figure 5:
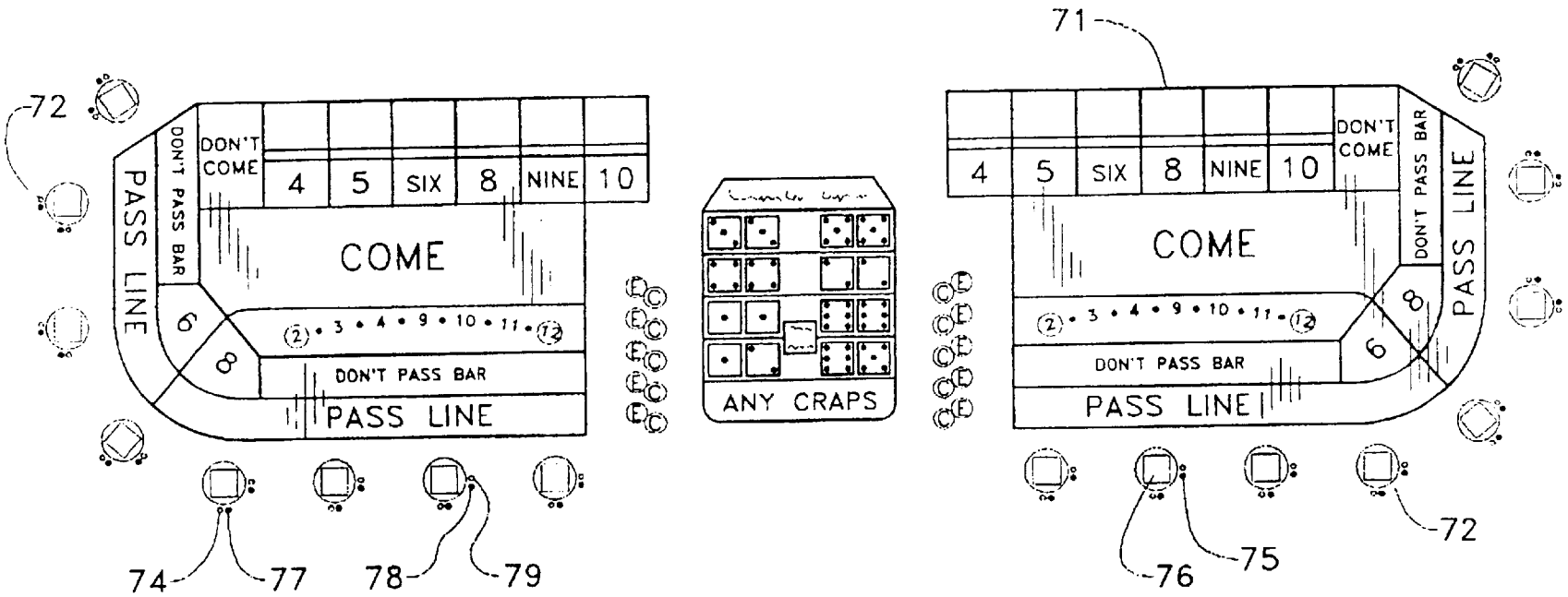
Figure 6:
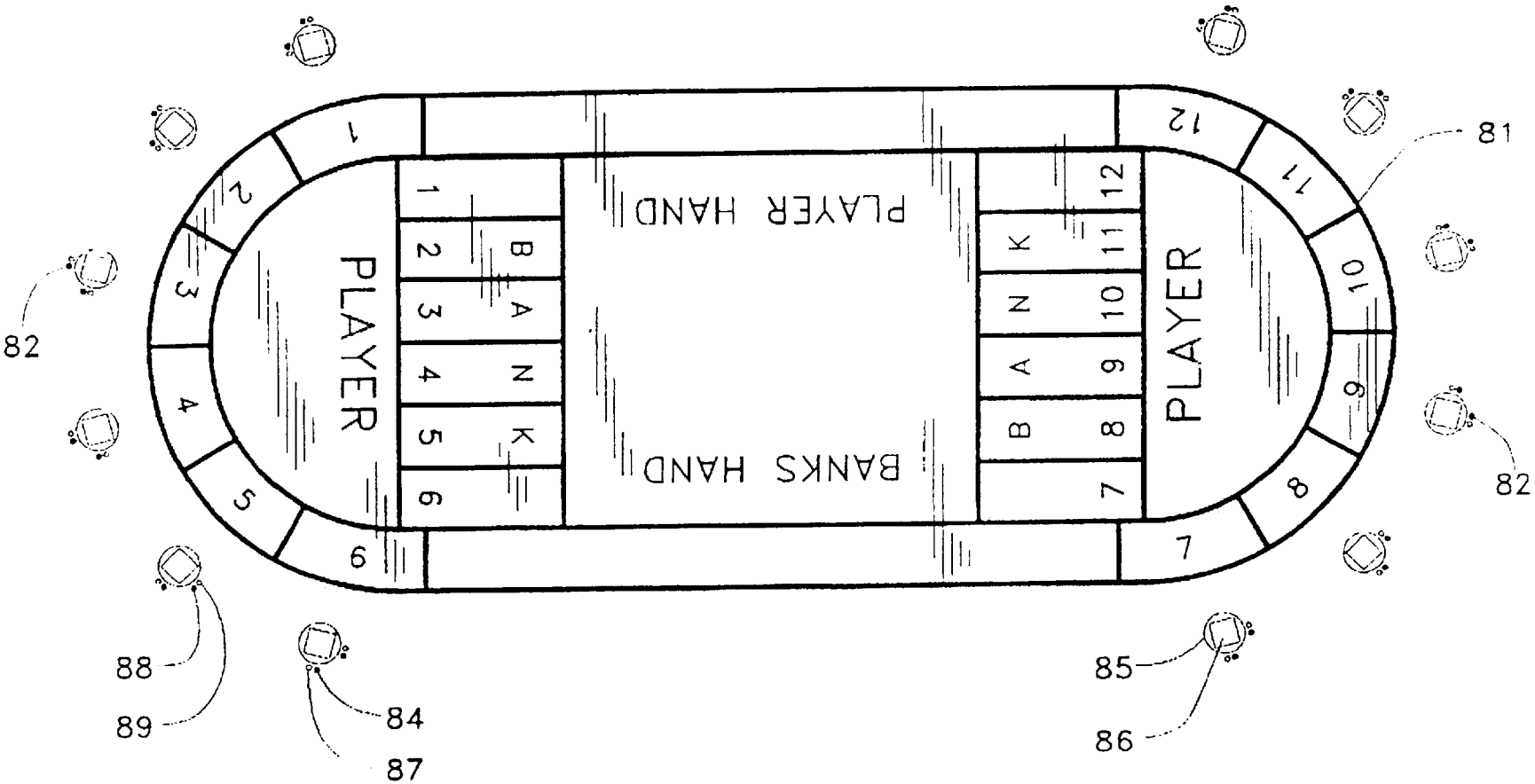

If desired, streak bets may be utilized in the play of roulette as shown in FIG. 4 or in craps as shown in FIG. 5 or baccarat as shown in FIG. 6.

The arrangement shown in FIG. 2 is used by the dealer to indicate to the player and the dealer how many consecutive wins in roulette (see FIG. 4) are selected by the player in order for the player to receive an enhanced payoff amount. In the embodiment of FIG. 4, the game of roulette the player can play any even money bet—i.e. odd or even, black or red and 1 to 18 or 19 to 36 numbers selection area.

Players select a dollar amount for the consecutive wins bet in the same manner as was previously described for FIGS. 1–3e. The conventional roulette bets, however, are placed directly on the odd/even, red/black 1–18 or 19–36 numbers area or directly on specific numbers or a specific range of numbers. The player also selects a number of consecutive wins which may be the consecutive number of assorted even bet wins, odd bet wins, red bet wins, black bet wins, or number wins, according to the type of consecutive win bets permitted by the house. For example, the house may limit the consecutive win bet to the number of consecutive odd wins or consecutive even wins or may limit the bet to consecutive red wins or black wins, etc. Each player area for receiving consecutive win bets is of the type shown in FIG. 2 and is convenient to both the player and the croupier.

Each game is played in the same fashion as a conventional game of roulette with the croupier keeping a count of the number of consecutive wins using the same technique described in conjunction with FIGS. 2 through 3e, a winner, or loser, being determined in accordance with the rules set forth hereinabove.

FIG. 5 is a third embodiment of the system where the game of chance is craps played at a craps table 71. Similar to the blackjack and roulette tables described above, a conventional craps table 71 is modified by distributing a plurality of betting areas and placing them at each multiple player standing area 72 which is also convenient to the croupier. Each betting area 75 includes a chip receiving pattern as shown in FIG. 2, which is used by the player and dealer to make a bet and further to monitor the consecutive wins or losses in order to determine if a player is entitled to an enhanced payoff. In the game of craps, and in this embodiment of the system, the player also has the choice of indicating whether the player believes he will win or lose and so indicating by selection of player win or player loss which can be identified by replacing the original bet circle with one circle for win or one for lose. Thus, the player can achieve an enhanced payoff by placing a bet which indicates that he believes he will win a consecutive number of games or lose a given number of consecutive games. Of course, the dollar amount of the bet is signified by the player placing his chips within betting area 76 and successive plays are monitored by the dealer in the same manner as described above in connection with the game of blackjack, for example.

FIG. 5 shows a sixth embodiment of the system in which the game of chance is baccarat, played at a baccarat table 81, having multiple player seating areas 82 distributed around table 81 and a dealer area 83. Each player seating area 82 has a special betting area 85, which includes chip receiving markings of the type shown in FIG. 2. However, in the game of baccarat, the player has the option of indicating to the system whether he believes that the player will win, or that the bank will win. The dollar amount of the bet is signified by the player by placing the desired number of chips within betting circle 85.

The game of baccarat is played in the conventional manner with the dealer monitoring the number of wins for each player employing a streak coins (see FIG. 2). The player either wins or loses a consecutive wins bet according to substantially the same rules as set forth hereinabove, namely if a player loses the last game or any one of the games played before reaching the selected number of consecutive wins, the player loses.

It should be understood that the odds for the number of consecutive wins for the various games such as roulette, craps, baccarat and poker will be different as compared with the odds of winning a consecutive number of blackjack games.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A method of playing blackjack, comprising the steps of:

(a) providing a conventional game receiving region and a plurality of consecutive win chip receiving regions for the player, each such region identifying a number of consecutive wins starting with the number two and up to a maximum number of chip receiving regions permitted by rules of the game;

(b) the player making a conventional bet of a denomination within the denomination range permitted by rules of the game;

(c) the player making a bet selecting a predetermined number of consecutive wins by placing the bet in one of a predetermined group of consecutive win bet receiving regions for use by the player, each bet receiving region representing a different number of consecutive wins, the bet being of a denomination permitted by rules of the game;

(d) dealing the player and dealer a predetermined number of cards;

(e) dealing the player and the dealer additional cards, when necessary until the game is complete;

(f) deciding the winner of the game in accordance with conventional blackjack rules;

(g) providing a streak chip for use in monitoring a number of consecutive wins made by the player;

(h) placing the streak chip upon the chip receiving region identifying two consecutive wins to be attempted when the player has won the first game;

(i) repeating step (b) preparatory to the play of the second game;

(j) repeating steps (d) through (f) during the play of each succeeding game;

(k) transferring the streak chip to successively higher numbered consecutive wins bet receiving regions until the streak chip is placed upon the consecutive win bet receiving area in which the consecutive win bet was originally placed; and (l) paying a player an amount equal to the denomination of the consecutive wins bet made by the player at step (c) multiplied by the odds for the consecutive wins selected when the player wins a game following step (k).

2. The method of claim 1 further comprising:

(m) designating the player as a losing player if the player loses any game representing the total number of consecutive wins selected at step (c) by the player and removing the player's consecutive wins bet.

3. The method of claim 1 wherein the maximum permissible number of consecutive wins is four and the designated consecutive wins chip receiving areas are identified by designating numerals "2", "3" and "4", respectively.

4. The method of claim 1 wherein step (g) further includes marking the streak chip so as to distinguish the streak chip from any betting chip used by the player.

5. The method of claim 1 wherein step (a) is further comprised of providing an indication of the payment odds for achieving the number of consecutive wins for each associated consecutive wins chip receiving region.

6. The method of claim 5 wherein the step of providing the odds further includes providing four for one odds for two consecutive wins, eight for one odds for three consecutive wins and eighteen for one odds for four consecutive wins.

7. The method of claim 1 further comprising advancing the streak chip to a next higher number consecutive wins chip receiving region when a dealer's hand and the player's hand have the same count.

8. The method of claim 1 wherein the streak chip is not advanced to a next higher consecutive win chip receiving region when a dealer's hand and a player's hand have a same count.

9. The method of claim 1 wherein when a player splits a hand one or more times during a play of any game prior to winning a consecutive wins bet, the streak bet will win or lose depending on the net result of the split or splits, a net result of no gain will not result in a loss nor will result in a streak chip advancing to the next higher consecutive win chip receiving region.

10. A method of playing a game of chance, comprising the steps of:

(a) providing a conventional game receiving region and a plurality of consecutive win chip receiving regions for the player, each such region identifying a number of consecutive wins starting with the number two and up to a maximum number of chip receiving regions permitted by rules of the game;

(b) the player making a conventional bet of a denomination within the denomination range permitted by rules of the game;

(c) the player making a bet selecting a predetermined number of consecutive wins by placing the bet in one of a predetermined group of consecutive win bet receiving regions for use by the player, each bet receiving region representing a different number of consecutive wins, the bet being of a denomination permitted by rules of the game;

(d) playing the game of chance;

(e) deciding the winner of the game in accordance with conventional rules of the game;

(f) providing a streak chip for use in monitoring a number of consecutive wins made by the player;

(g) placing the streak chip upon the chip receiving region identifying two consecutive wins to be attempted when the player has won the first game;

(h) repeating step (b) preparatory to the play of the second game;

(i) repeating steps (d) and (e) during the play of each succeeding game;

(j) transferring the streak chip to successively higher numbered consecutive wins bet receiving regions until the streak chip is placed upon the consecutive win bet receiving area in which the consecutive win bet was originally placed; and (k) paying a player an amount equal to the denomination of the consecutive wins bet made by the player at step (c) multiplied by the odds for the consecutive wins selected when the player wins a game following step (j).

11. The method of claim 10 further comprising:

(m) designating the player as a losing player if the player loses any game representing the total number of consecutive wins selected at step (c) by the player and removing the player's consecutive wins bet.

12. The method of claim 10 wherein the maximum permissible number of consecutive wins is four and the designated consecutive wins chip receiving areas are identified by designating numerals "2", "3" and "4", respectively.

13. The method of claim 10 wherein step (g) further includes marking the streak chip so as to distinguish the streak chip from any betting chip used by the player.

14. The method of claim 10 wherein step (a) is further comprised of providing an indication of the payment odds for achieving the number of consecutive wins for each associated consecutive wins chip receiving region.

15. The method of claim 10 wherein the game of chance is blackjack.

16. The method of claim 10 wherein the game of chance is baccarat.

17. The method of claim 10 wherein the game of chance is craps.

18. The method of claim 10 wherein the game of chance is roulette.

19. The method of claim 18 wherein the number of consecutive wins is the number of consecutive games in which an even bet is won by a player.

20. The method of claim 18 wherein the number of consecutive wins is the number of consecutive games in which an odd bet is won by a player.

21. The method of claim 18 wherein the number of consecutive wins is the number of consecutive games in which one of an even and an odd bet is won by a player.

22. The method of claim 18 wherein the number of consecutive wins is the number of consecutive games in which a red bet is won by a player.

23. The method of claim 18 wherein the number of consecutive wins is the number of consecutive games in which a black bet is won by a player.

24. The method of claim 18 wherein the number of consecutive wins is the number of consecutive games in which one of a red bet and a black bet is won by a player.

25. The method of claim 18 wherein the number of consecutive wins is the number of consecutive games in which one of 1–18 or 19–36 number areas bet selection is won by a player.

26. The method of claim 10 wherein the game of chance is poker.

*27. A method of playing blackjack, comprising the steps of:*

(*a*) *providing a conventional game receiving region and a plurality of consecutive win chip receiving regions for the player, each such region identifying a number of consecutive wins starting with the number two and up to a maximum number of chip receiving regions permitted by rules of the game;*

(*b*) *the player making a bet selecting a predetermined number of consecutive wins by placing the bet in one of a predetermined group of consecutive win bet receiving regions for use by the player, each bet receiving region representing a different number of consecutive wins, the bet being of a denomination permitted by rules of the game;*

(*c*) *dealing the player and dealer a predetermined number of cards;*

(*d*) *dealing the player and the dealer additional cards, when necessary until the game is complete;*

(*e*) *deciding the winner of the game in accordance with conventional blackjack rules; and*

(*f*) *providing a streak chip for use in monitoring a number of consecutive wins made by the player;*

(*g*) *placing the streak chip upon a chip receiving region identifying two consecutive wins to be attempted when the player has won the first game;*

(*h*) *repeating steps* (*c*) *through* (*e*) *during the play of each succeeding game;*

(*i*) *transferring the streak chip to successively higher numbered consecutive wins bet receiving regions until the streak chip is placed upon the consecutive win bet receiving area in which the consecutive win bet was originally placed; and*

(*j*) *paying a player an amount equal to the denomination of the consecutive wins bet made by the player at step* (*b*) *multiplied by the odds for the consecutive wins selected when the player wins a game following step* (*i*).

*28. A method of playing a game of chance, comprising the steps of:*

(*a*) *providing a conventional game receiving region and a plurality of consecutive win chip receiving regions for the player, each such region identifying a number of consecutive wins starting with the number two and up to a maximum number of chip receiving regions permitted by rules of the game;*

(*b*) *the player making a bet selecting a predetermined number of consecutive wins by placing the bet in one of a predetermined group of consecutive win bet receiving regions for use by the player, each bet receiving region representing a different number of consecutive wins, the bet being of a denomination permitted by rules of the game;*

(*c*) *playing the game of chance;*

(*d*) *deciding the winner of the game in accordance with conventional rules of the game;*

(*e*) *providing a streak chip for use in monitoring a number of consecutive wins made by the player;*

(*f*) *placing the streak chip upon a chip receiving region identifying two consecutive wins to be attempted when the player has won the first game;*

(*h*) *repeating steps* (*c*) *and* (*d*) *during the play of each succeeding game;*

(*i*) *transferring the streak chip to successively higher numbered consecutive wins bet receiving regions until the streak chip is placed upon the consecutive win bet receiving area in which the consecutive win bet was originally placed; and*

(*j*) *paying a player an amount equal to the denomination of the consecutive wins bet made by the player at step* (*b*) *multiplied by the odds for the consecutive wins selected when the player wins a game following step* (*i*).

* * * * *